United States Patent Office 2,996,410
Patented Aug. 15, 1961

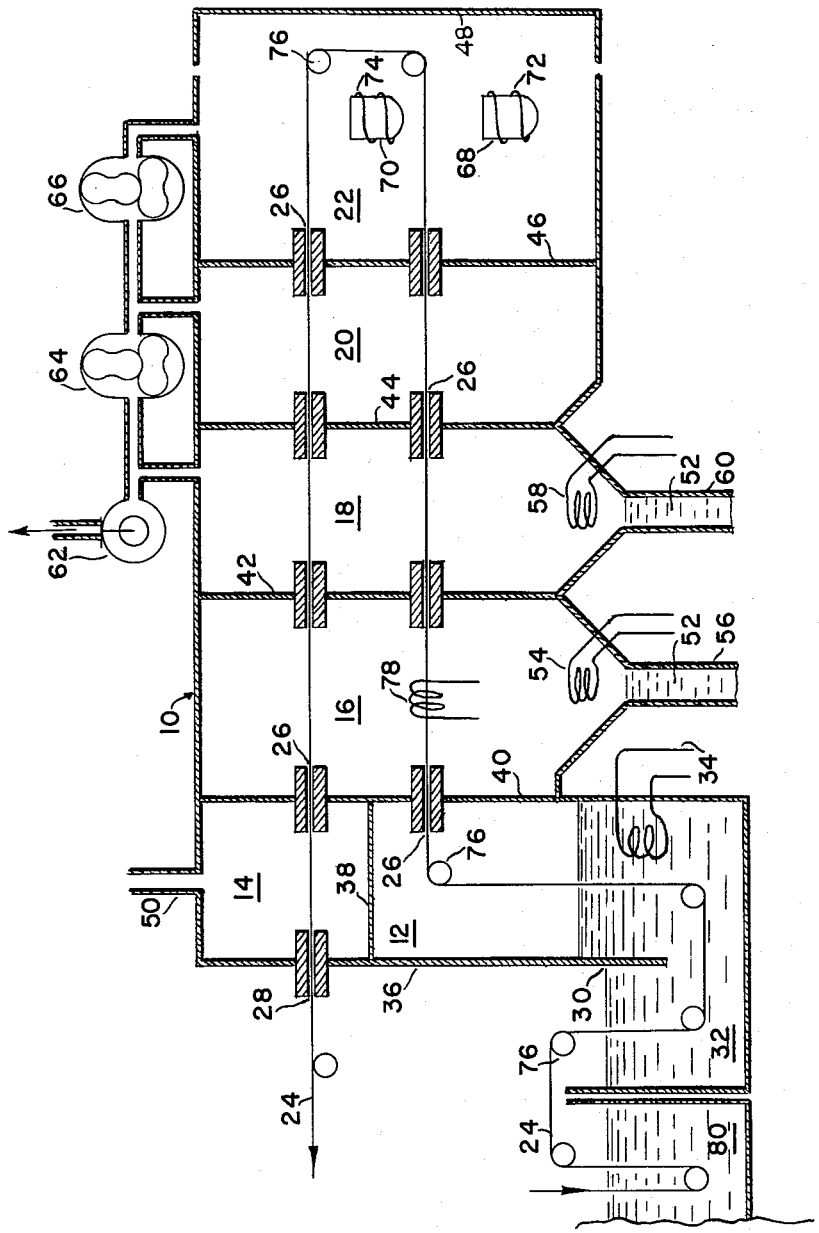

2,996,410
COATING
Milo P. Hnilicka, Jr., Concord, Mass., assignor, by mesne assignments, to National Steel Corporation, a corporation of Delaware
Filed Nov. 25, 1957, Ser. No. 698,626
15 Claims. (Cl. 117—107)

The present invention relates to a method and apparatus for the coating of metallic and non-metallic substrates in a vacuum.

A principal object of the present invention is to provide an improved method for the vacuum coating of metallic and non-metallic substrates.

Another object of the invention is to provide improved apparatus for the vacuum coating of substrates of the above type.

Still another object of the invention is to provide a novel type of vacuum sealing system for apparatus of the above type so that continuous coating operations can be achieved.

Other objects of the invention will in part be obvious and will in part appear hereinafter.

The invention accordingly comprises the method involving the several steps and the relation and the order of one or more such steps with respect to each of the others and the apparatus possessing the construction, combination of elements and arrangement of parts which are exemplified in the following detailed disclosure and the scope of the application of which will be indicated in the claims.

For a fuller understanding of the nature and objects of the invention, reference should be had to the following detailed description taken in connection with the accompanying drawing which is a diagrammatic, schematic view of one embodiment of the invention.

The present invention is directed to vacuum coating and particularly to apparatus for introducing and withdrawing a substrate from a vacuum coating chamber. This apparatus comprises an end chamber with at least one passage leading to the atmosphere, means for maintaining an atmosphere consisting predominantly of a condensible vapor within the end chamber, a second chamber in communication with the end chamber by means of at least one restricted passage, and means for maintaining the second chamber at a lower pressure than the end chamber by condensing the majority of the condensible vapors leaking into the second chamber. A third chamber is in communication with the second chamber by means of at least one restricted passage and is provided with means for maintaining the third chamber at a lower pressure than the second chamber. A source of coating vapors is included in the third chamber or a fourth chamber at a high vacuum connected to the third chamber. Means are provided for passing the substrate through the passages and chambers. In one embodiment of the invention there is provided means for maintaining the temperature of the substrate passing through the vacuum system above the condensation temperature of the condensible vapors in the various chambers through which it passes, particularly the high vacuum chambers.

The present invention is a vast improvement, technically and economically, over known coating systems. By maintaining an atmosphere of a condensible vapor within a chamber with at least one passage leading to, or in communication with, the atmosphere, the differences in pressure therebetween can be made such that there is no tendency for air to leak into the system. For instance, by maintaining in the chamber an atmosphere consisting predominantly of a condensible vapor at a pressure which is slightly higher than that of the atmosphere, the condensible vapors must flow from the region of higher pressure to that of lower pressure. The condensible vapors therefore can be made to flow through the passages or openings from the chamber to the atmosphere and thus prevent any air from entering the passages into the vacuum system. The passages into and out of the chamber in communication with the atmosphere can, accordingly, be made sufficiently large so as to permit the free movement of material therethrough. By preventing air from entering the vacuum system, the pumping systems are not overtaxed and smaller capacity, less expensive pumping systems can be employed. The condensing of the condensible vapors leaking into the second chamber maintains the second chamber at a reduced pressure. The removal or pumping of a liquid from the system is easier and more economical than the pumping of a gas. It should be noted that the pumping requirements for a given amount of liquid per unit of time at a low pressure is tremendously less than that required to pump a corresponding mass of vapors.

For convenience of illustration the invention will be described in connection with the use of water as the liquid to be vaporized in the end chamber, without intent to limit the invention.

Referring now to the drawing, 10 represents a vacuum coating device comprising a plurality of chambers or compartments 12, 14, 16, 18, 20 and a coating chamber 22. One or more additional chambers can be provided if desired, between chamber 20 and the coating chamber 22. Instead of the arrangement illustrated, there can be provided a series of chambers such that the substrate 24 passes straight through the vacuum system. In other words, there can be provided a plurality of chambers such as 12, or 14, 16, 18, 20 on either side of the coating chamber 22. The chambers are connected with each other by means of restricted passages or openings 26. End chamber 14 is in communication with the atmosphere by means of passage 28. End chamber 12 is in communication with the atmosphere by means of passage 30, here illustrated as a barometric leg containing the liquid 32 (e.g., water) to be vaporized in chamber 12. The barometric leg 30 is provided with suitable heating means 34. The chambers are defined by partitions or walls 36, 38, 40, 42, 44, 46 and 48.

Chamber 14 is preferably maintained under a slight superatmospheric pressure of a condensible vapor such as steam by introducing the steam through conduit 50 from a suitable source (not shown). Instead of introducing the steam from an outside source, the steam can be produced within chamber 14 by providing therein a supply of water and a suitable heating means. Additional quantities of water are introduced into the chambers by suitable means (not shown).

The water vapors leaking through the passages 26 in wall 40 are removed from chamber 16 as a liquid 52. The condensation of the water is achieved by condensing means 54 shown here as coils cooled by suitable means (e.g. water at room temperature). The condensed water 52 is removed from chamber 16 through drain 56 by means of a pump of suitable barometric leg arrangement, not shown. Chamber 18 is also preferably provided with suitable condensing means 58 which can be maintained at a temperature just above freezing. A drain 60 provides for the removal of the cold condensed water. Chamber 18, 20 and 22 are evacuated through conduits by means of suitable pumping systems wherein 62 illustrates a rotary vacuum pump and 64 and 66 are high vacuum blowers. Pumping systems other than those illustrated can also be employed.

Within coating chamber 22 is a source 68 (illustrated here as a crucible means) for holding the metal such as aluminum to be melted and evaporated. When the substrate 24 is to be coated on both sides an additional source 70 is employed. The sources 68 and 70 are suitably heated by means 72 and 74, respectively, illustrated as induction heating means. Other types of sources and heating means can also be satisfactorily employed. The substrate 24 is guided into, through and out of the vacuum system by means of a plurality of rollers or idlers 76 which can be free moving or driven.

Substrate heating means 78 is preferably provided, these heating means being illustrated as induction heaters in chamber 16. Additional heating means can also be located outside the vacuum coater, or in any one of several of the chambers preceding the coating chamber. One purpose of the heating means is to insure that the substrate is maintained above the condensation temperature of the water vapors, particularly in the higher vacuum chambers 18 and 20 so that the substrate does not physically carry water into the high vacuum chambers.

The operation of the apparatus will be initially described in connection with the coating of sheet steel with aluminum although the invention is applicable to the coating of paper, cellophane, polyethylene, polyethylene terephthalate and the like with aluminum or other materials. A suitable sheet of steel is aligned in the manner indicated in the drawing. Receiving rolls, not shown, are provided to take up the coated substrate after it emerges from the vacuum system.

The crucible 68 is charged with aluminum to be evaporated. Crucible 70 is also charged if both sides of the substrate are to be coated. Means can be provided to feed additional quantities of aluminum to the crucibles so as to provide for prolonged coating operations. The chambers 18, 20 and 22 are evacuated by means of pumps 62, 64 and 66, respectively, so that a steep pressure gradient is obtained.

An atmosphere consisting predominantly of steam is provided within chamber 14, either by introducing the steam therein or by vaporizing a supply of the water within the chamber. The pressure in chamber 14 is maintained slightly higher than that of the atmosphere so that the steam vapors must flow outwardly through passage 28 thus preventing air from leaking into the system through passage 28.

The water 32 within the barometric leg 30 is heated to a temperature sufficient to cause vaporization thereof within chamber 12 which is shown as being maintained at a slightly reduced pressure. When the water 32 is maintained at about 90° C. it will give a water vapor pressure of about 525 mm. Hg abs. in chamber 12. This hot water will also serve to preheat the steel to a temperature which is above the condensation temperature of the water vapor in chamber 16. The use of a barometric leg as shown has many advantages. For instance, the water leg can serve as a final rinse solution for the substrate which has previously been subjected to various cleaning solutions represented in the drawing as 80. It can also serve as a cleaning solution for the substrate by dissolving therein suitable cleansing agents such as detergents and the like. Additionally, where the substrate is one which is readily oxidizable e.g. sheet steel, it must be kept, from the time it is cleaned until coated, under non-oxidizing conditions in order to avoid formation of oxide films which adversely affect the bonding between the substrate and coating. By maintaining the water in the barometric leg near the boiling point, dissolved oxygen therein is eliminated. Likewise, the maintenance of an atmosphere consisting predominantly of steam in chamber 12 provides a substantially inert medium.

The majority of the mass of steam leaking through passages 26 (in wall 40) from chambers 12 and 14 into chamber 16 is condensed in chamber 16 by cooling coil 54 which is preferably maintained at about 20° C. The conversion of steam to water at 20° C. reduces the partial pressure of water vapor within chamber 16 to about 17.5 mm. Hg abs. without the use of other pumping means. Since almost all the mass of gas in chamber 16 is water vapor, a very small mechanical vacuum pump can maintain the total pressure in chamber 16 near 17.5 mm. Hg abs. The condensed water is suitably removed from chamber 16 through the drain 56.

The relatively smaller amounts of a mixture of water vapor and non-condensible gases which leak into chamber 18 from chamber 16 are preferably removed by employing a suitable vacuum pumping system 62 in combination with a condensing means 58. The condensing means is preferably maintained at a temperature (e.g., +1° C.) which is lower than the temperature of condensing means 54 of chamber 16 so as to give a low partial pressure of water vapor, of about 4.9 mm. Hg abs., in chamber 18. If desired, the water vapor in chamber 18 can be condensed at a temperature below its freezing point by use of a refrigerated brine solution or by condensing the water vapor to ice and mechanically removing the ice. When refrigerated brine of −20° C. is employed, the water vapor pressure will be about .7 mm. Hg abs.

The aluminum vapor sources 68 are heated to melt and evaporate the aluminum charged therein. When the desired evaporation temperature (e.g. 1100° C.) and pressures (e.g. .001 mm. Hg abs.) within each chamber have been attained, then the substrate 24 is continuously advanced in the manner indicated. The substrate during its passage through the vacuum system is preferably maintained at an elevated temperature (e.g. 100° C.) which is above the condensation temperature of the water vapor. This can be accomplished by heating the substrate with an induction coil 78 within the vacuum system such as shown in chamber 16.

Obviously many changes can be made in the described apparatus. For example, instead of employing a combination of a barometric leg seal and a condensible vapor seal, there can be employed, two barometric leg seals or two condensible vapor seals. In the latter case, chambers 12 and 14 are merged into one chamber.

The condensible vapor employed with chambers 12 and 14 must be inert to the substrate to be coated. That is, it must not effect the substrate either chemically or physically. Steam is the preferred vapor, although many organic materials such as alcohols, aldehydes, esters, ketones, halogenated hydrocarbons, such as carbon halides, mixed halogenated hydrocarbons (Freons) and the like can also be employed. It is preferable when utilizing the apparatus shown to employ the same kind of condensible vapors in chambers 12 and 14. When steam is employed as the condensible vapor the cost is small and the loss through the passages into the atmosphere is of no consequence.

When somewhat more costly condensible vapors, such as halogenated hydrocarbons, are employed, appreciable losses will increase the cost of operation. The apparatus described above is then suitably modified so as to provide for recovery and recycle of the condensible vapor. In this case an additional chamber is provided between chamber 14 and the atmosphere. This additional chamber is provided with a pumping means leading to a suitable condensing means, separator, and boiler or vaporizer. In this embodiment chamber 14 is provided with an atmosphere consisting predominantly of a condensible vapor. The additional chamber is maintained at a reduced pressure so that atmospheric air and the condensible vapors both flow into the additional chamber. The condensible vapors can be condensed in the additional chamber or a mixture of condensible vapors and non-condensible gases is withdrawn from the additional chamber. In any case the condensible vapors are condensed and separated from the non-condensible gases and the condensate is fed to a suitable vaporizer wherein it is re-vaporized and recycled to chamber 14. The condensate 52 obtained in chamber 16 can also be fed to the vaporizer, Since certain changes can be made in the above method and apparatus without departing from the scope of the invention herein involved, it is intended that all matter contained in the above description or shown in the accompanying drawings shall be interpreted as illustrative and not in a limiting sense.

What is claimed is:

1. A method for coating a substrate in a vacuum coating system which comprises maintaining an atmosphere consisting predominantly of a condensible vapor in an end chamber with at least one passage leading to the atmosphere, maintaining a second chamber at a lower pressure than the end chamber by condensing the majority of the mass of condensible vapors leaking into said second chamber through at least one restricted passage between said end chamber and said second chamber, maintaining a third chamber at a lower pressure than the second chamber, said third chamber being in communication by at least one restricted passage with said second chamber, passing said substrate through said passages and chambers, vacuum coating the substrate while under high vacuum, and maintaining the temperature of the substrate while passing through said chambers above the condensation temperature of the condensible vapor.

2. A method for coating an iron sheet in a vacuum coating system which comprises passing the iron sheet from atmosphere through a passage into an end chamber, maintaining an atmosphere consisting predominantly of water vapor in said end chamber, passing the iron sheet through a restricted passage into a second chamber, maintaining said second chamber at a lower pressure than said end chamber by condensing water vapor leaking into said second chamber through the restricted passage, passing the iron sheet through another restricted passage into a third chamber, maintaining said third chamber at a lower pressure than the second chamber, by condensing water vapor leaking into the third chamber, vacuum coating said substrate, and maintaining the temperature of the iron sheet while passing through said second and third chambers above the condensation temperature of the water vapor in the second and third chambers.

3. A method according to claim 2 wherein one of the passages into the end chamber is filled with hot water.

4. A method according to claim 2 wherein the end chamber is maintained at a water vapor pressure above atmospheric.

5. A method according to claim 2 wherein steam in the third chamber is removed by condensing water vapor within said third chamber at a temperature below the temperature of the water vapor in the second chamber and removing the resultant water from the third chamber.

6. The method of claim 1 wherein the pressure in said end chamber is above atmosphere pressure.

7. A method for coating a substrate in a vacuum system which comprises maintaining an end chamber with at least one passage leading to the atmosphere at a pressure below atmospheric pressure, maintaining an atmosphere consisting predominantly of a condensible vapor in a second chamber which is in communication with said end chamber by at least one restricted passage, maintaining a third chamber at a lower pressure than said second chamber by condensing the majority of the mass of condensible vapors leaking into said third chamber through at least one restricted passage between said second and third chambers, maintaining a fourth chamber at a lower pressure than the third chamber, the fourth chamber being in communication with said third chamber by at least one restricted passage, passing said substrate through said passages and chambers, vacuum coating said substrate, and maintaining the temperature of the substrate while passing through said chambers above the condensation temperature of the condensible vapors in the third chamber.

8. A method according to claim 1 wherein the condensible vapors leaking into said first and third chambers are condensed and recovered for reuse.

9. An apparatus for coating a substrate in a vacuum coating system which comprises an end chamber with at least one passage leading to the atmosphere, means for maintaining an atmosphere consisting predominantly of a condensible vapor within said end chamber, a second chamber in communication with said end chamber by means of at least one restricted passage, means for condensing the majority of the mass of condensible vapor leaking into said second chamber to maintain a reduced pressure therein, a third chamber in communication with said second chamber by means of at least one restricted passage, means for maintaining said third chamber at a lower pressure than the second chamber by condensing vapors leaking into said third chamber, means for passing the substrate through said passages and chambers, means for vaporizing a coating material so as to deposit a coating on said substrate, and means for maintaining the temperature of the substrate while passing through said chambers above the condensation temperature of the condensible vapors.

10. An apparatus for coating a substrate in a vacuum coating system which comprises an end chamber with at least one passage leading to the atmosphere, means for maintaining said end chamber at a pressure below atmospheric pressure, a second chamber in communication with said end chamber by means of at least one restricted passage, means for maintaining an atmosphere consisting predominantly of a condensible vapor within said second chamber, a third chamber in communication with said second chamber by means of at least one restricted passage, means for condensing the majority of the mass of condensible vapors leaking into said third chamber to maintaining a reduced pressure therein, a fourth chamber in communication with said third chamber by means of at least one restricted passage, means for maintaining said fourth chamber at a lower pressure than the third chamber, means for passing said substrate through said passages and chambers, and means for maintaining the temperature of the substrate while passing through said chambers above the condensation temperature of the condensible vapors.

11. An apparatus for coating a substrate in a vacuum coating system which comprises an end chamber with a passage leading to the atmosphere, means for maintaining an atmosphere consisting predominantly of water vapor within said end chamber, a second chamber in communication with said end chamber by means of at least one restricted passage, means for condensing the majority of the mass of water vapor leaking into said second chamber to maintain a reduced pressure therein, a third chamber in communication with said second chamber by means of at least one restricted passage, means for maintaining said third chamber at a lower pressure than the second chamber by condensing water vapors leaking into said third chamber, means for passing the substrate through said passages and chambers, means for vaporizing a coating material so as to deposit a coating on said substrate, and means for maintaining the temperature of the substrate while passing through said chambers above the condensation temperature of the water vapor.

12. Apparatus of the type claimed in claim 11 wherein said passage between the atmosphere and the end chamber is filled with water.

13. Apparatus of the type claimed in claim 12 wherein heating means is provided for maintaining the water in the water-filled passage at an elevated temperature.

14. Apparatus of the type claimed in claim 11 wherein the third chamber includes means for condensing water vapor at a temperature substantially below the temperature of condensation of water vapor in the second chamber.

15. Apparatus of the type claimed in claim 11 wherein said end chamber contains water vapor at superatmospheric pressure.

References Cited in the file of this patent

UNITED STATES PATENTS

| | | | |
|---|---|---|---|
| 1,595,475 | Minton | Aug. 10, | 1926 |
| 2,239,770 | Becker et al. | Apr. 29, | 1941 |
| 2,382,432 | McManus et al. | Aug. 14, | 1945 |
| 2,384,500 | Stoll | Sept. 11, | 1945 |
| 2,562,182 | Godley | July 31, | 1951 |
| 2,656,284 | Toulmin | Oct. 20, | 1953 |
| 2,812,270 | Alexander | Nov. 5, | 1957 |